United States Patent
Wei et al.

(10) Patent No.: US 12,240,924 B2
(45) Date of Patent: Mar. 4, 2025

(54) HIGHLY ALKALI-STABLE CATIONIC POLYMERS AND THEIR PREPARATION METHODS AND APPLICATIONS

(71) Applicants: HEFEI UNIVERSITY OF TECHNOLOGY, Hefei (CN); ANQING POLYROCKS TECHNOLOGY RESEARCH CO., LTD., Anqing (CN)

(72) Inventors: Haibing Wei, Hefei (CN); Tao Wang, Hefei (CN); Hongfang Zhu, Anqing (CN); Yatao Liang, Anqing (CN); Ming Xu, Hefei (CN); Duoying Chen, Hefei (CN); Yunsheng Ding, Hefei (CN)

(73) Assignees: HEFEI UNIVERSITY OF TECHNOLOGY (CN); ANQING POLYROCKS TECHNOLOGY RESEARCH CO., LTD. (CN)

( * ) Notice: Subject to any disclaimer, the term of this patent is extended or adjusted under 35 U.S.C. 154(b) by 0 days.

(21) Appl. No.: 18/652,840

(22) Filed: May 2, 2024

(65) Prior Publication Data
US 2024/0317902 A1    Sep. 26, 2024

(30) Foreign Application Priority Data
Nov. 6, 2023  (CN) .......................... 202311481623.0

(51) Int. Cl.
C08F 2/06 (2006.01)
B01J 37/00 (2006.01)
C08F 26/06 (2006.01)

(52) U.S. Cl.
CPC ............. *C08F 2/06* (2013.01); *B01J 37/0009* (2013.01); *C08F 26/06* (2013.01)

(58) Field of Classification Search
CPC .......... C08F 2/06; C08F 26/06; B01J 37/0009
(Continued)

(56) References Cited

U.S. PATENT DOCUMENTS

| 2005/0129655 A1* | 6/2005 | Rauser | A61P 43/00 424/78.08 |
| 2019/0036143 A1* | 1/2019 | Yan | H01M 8/106 |

FOREIGN PATENT DOCUMENTS

| CN | 112552488 A | * 3/2021 |
| CN | 115109391 A | 9/2022 |

(Continued)

OTHER PUBLICATIONS

Tao Jiang et al., Highly stable poly(p-quaterphenylene alkylene)-based anion exchange membranes, Journal of Membrane Science, Feb. 4, 2022, vol. 647, p. 120342 of 12.

*Primary Examiner* — Michael M. Bernshteyn (57) ABSTRACT

The present invention discloses a preparation method of highly alkali-stable cationic polymers, including the following steps: placing a polymerization mixture comprising 1-R1-3-piperidinone or its salts or hydrate thereof and arene monomers in a first organic solvent, performing catalytic polycondensation by adding organic strong acids, and obtaining a polymer dispersion with piperidine moieties; slowly dropping the dispersion of the polymer with piperidine moieties into a first precipitant, and obtaining a polymer powder with piperidine moieties after drying; dissolving the polymer powder with piperidine moieties of in a second organic solvent, after adding the quaternization reagent, obtaining a cationic polymer solution. The cationic polymers prepared by the above steps can greatly improve its alkaline stability by adjusting the connection position between the piperidinium group and the arylene units, it can be used in applications such as, for example, anion exchange
(Continued)

membranes and catalyst layer binders, featuring with outstanding alkaline stability.

11 Claims, 5 Drawing Sheets

(58) Field of Classification Search
USPC .......................................................... 526/258
See application file for complete search history.

(56) References Cited

FOREIGN PATENT DOCUMENTS

CN            115548397 A  *  12/2022
WO     WO-2024014818 A1  *  1/2024

* cited by examiner

HIGHLY ALKALI-STABLE CATIONIC POLYMERS AND THEIR PREPARATION METHODS AND APPLICATIONS

TECHNICAL FIELD

The present invention relates to the field of cationic polymer technology, in particular to highly alkali-stable cationic polymers and their preparation methods and applications.

BACKGROUND OF THE INVENTION

In recent years, the efficient production and utilization of hydrogen have become a new requirement for reducing the dependence on fossil energy and building a clean, low-carbon footprint, and efficient modern energy system. Wherein, anion exchange membrane fuel cell (AEMFC) and anion exchange membrane water electrolysis (AEMWE) have great application potential in conversion devices for renewable hydrogen energy. The alkaline operating environment of AEMFC and AEMWE allows non-noble metals to be used as their electrode catalysts, this will greatly reduce the cost of electrochemical conversion device, which promotes the large-scale application of AEMFC and AEMWE.

However, the alkaline operating environment also brings challenges to the alkaline stability of the polymer electrolytes in AEMFC and AEMWE. The polymer electrolytes in AEMFC and AEMWE are cationic polymers, it can conduct anions and is mainly used in anion exchange membrane (AEM) and catalyst layer binder. AEM plays the role of isolating anode and cathode electrodes and conducting ions, and the binder of the catalyst layer binds inorganic catalyst particles and conductive ions in the catalyst layer. The long-term alkaline operating durability of AEMFC and AEMWE is determined by the stabilities of AEM and catalyst layer binder.

After the efforts of many researchers, poly(arylene piperidinium)s are considered to be one of the most promising polymers used in alkaline electrochemical conversion devices. However, unlike the superior alkali-stability of piperidinium cations at the model compounds, the piperidinium cations in most poly(arylene piperidinium) polymers are directly connected to the aromatic units through the C-4 position, and the Hofmann elimination of the cations becomes easier, resulting in an insufficient alkaline stability.

Therefore, it is urgent to further improve the alkaline stability of poly(arylene piperidinium) polymers and maintain their high performance through structural design.

SUMMARY

The purpose of the present invention is to provide highly alkali-stable cationic polymers and their preparation methods and applications, which can improve the alkaline stability of the cationic polymers and maintain their high performance.

To achieve the above purpose, the present invention provides the preparation methods of highly alkali-stable cationic polymers, including the following steps:

S1. placing a polymerization compound mixture comprising 1-$R^1$-3-piperidinone or its salts or hydrate thereof and arenes in a first organic solvent, performing catalytic polycondensation by adding organic strong acids, performing the reaction at −20-100° C. for 0.1-200 h, and obtaining a polymer dispersion comprising the piperidine moieties;

in S1, 1-$R^1$-3-piperidinone having the following formula:

$R^1$ is independently selected from H, $C_{1-20}$-hydrocarbyl;

in S1, arenes having one or more of the following structures:

S2. slowly dropping the polymer dispersion from S1 with piperidine moieties into a first precipitant, filtering and washing the obtained fibrous polymer, and obtaining a polymer powder with piperidine moieties after vacuum drying;

S3. dissolving the polymer powder from S2 with piperidine moieties in a second organic solvent, then adding the quaternization reagent, obtaining a cationic polymer solution after a quaternization reaction at 0-100° C. for 0.1-200 h;

the quaternization reagents are dimethyl sulfate or halogenated hydrocarbons comprising 1 to 20 C atoms;

S4. slowly adding the cationic polymer solution from S3 to a second precipitant, and obtaining a cationic polymer powder by filtration and drying;

S5. immersing the cationic polymer powder from S4 in a solution containing other types of counterions for ion exchanging to obtain a cationic polymer containing other types of counterions.

Preferably, in S1, 1-$R^1$-3-piperidinone or its salts or hydrate thereof are including the following: 1-$R^1$-3-piperidinone, 1-$R^1$-3-piperidinone hydrochloride, 1-$R^1$-3-piperidinone hydrofluoric acid, 1-$R^1$-3-piperidinone hydrobromide, 1-$R^1$-3-piperidinone hydroiodide, 1-$R^1$-3-piperidinone trifluoroacetate, 1-$R^1$-3-piperidinone acetate, 1-$R^1$-3-piperidinone trifluoromethanesulfonate, 1-$R^1$-3-piperidinone methanesulfonate, 1-$R^1$-3-piperidinone sulfate, 1-$R^1$-3-piperidinone nitrate, 1-$R^1$-3-piperidinone tetrafluoroborate, 1-$R^1$-3-piperidinone hexafluorophosphate, 1-$R^1$-3-piperidinone formate, 1-$R^1$-3-piperidinone benzenesulfonate, 1-$R^1$-3-piperidinone methyl benzoate, 1-$R^1$-3-piperidinone perchlorate, and 1-$R^1$-3-piperidinone benzoate.

Preferably, in S1, arenes are one or more of the following compounds:

Preferably, in S1, the polymerization mixture also includes carbonyl monomers, which are one or more of the following formulas, wherein, $R^2$ is a hydrocarbyl or halogenated hydrocarbyl;
$R^3$ is independently selected from H, $C_{1-20}$-hydrocarbyl;
$R^4$ is an aryl, and the aryl is optionally substituted with halide and/or nitro and/or cyano.

Preferably, in S1, the first organic reagent is one or more of dichloromethane, chloroform, carbon tetrachloride, dichloroethane, nitromethane, and nitrobenzene.

The organic strong acid is at least one of methanesulfonic acid, trifluoromethanesulfonic acid, and trifluoroacetic acid.

Preferably, the ratio of 1-$R^1$-3-piperidinone or its salts or hydrate to the molar amount of the organic strong acid is between 1:1 and 1:20.

Preferably, the ratio of the sum of the molar amounts of 1-$R^1$-3-piperidinone or its salts or hydrate and carbonyl-containing compounds to the molar amount of the organic strong acid is between 1:1 and 1:20.

Preferably, in S2, the first precipitant is one or more from water, ethanol, methanol, and isopropanol.

Preferably, in S3, the second organic reagent is at least one of the polar aprotic solvents including dimethyl sulfoxide, N-methylpyrrolidone, N,N-dimethylacetamide, and N,N-dimethylformamide.

The quaternization reagents are dimethyl sulfate or halogenated hydrocarbons comprising 1 to 20 C atoms, and the formula is as follows:

wherein, $R^{51}$, $R^{52}$, $R^{53}$, and $R^{54}$ are independently selected from hydrogen, halogen, alkyl or halogenated alkyl groups comprising 1 to 20 C atoms, or aryl or halogenated aryl groups comprising 1 to 20 C atoms, and halogenated hydrocarbons comprising at least one halogen atom;

The molar ratio of the piperidine groups of the polymer to the quaternization reagent is between 1:1 to 1:10.

Preferably, in S3, one or more of potassium carbonate, potassium hydroxide, sodium carbonate, sodium bicarbonate, and sodium hydroxide can be added.

Preferably, in S4, the second precipitant is selected from one or more of water, acetone, ether, toluene, ethyl acetate, and petroleum ether.

Preferably, in S5, the other types of counterions are at least one of the ions selected from hydroxide ions, carbonate ions, bicarbonate ions, sulfate ions, or halogen ions different from the counterion $A^-$.

The concentration of the solution containing other types of counterions is between 0.01 to 10 mol/L.

Highly alkali-stable cationic polymers are prepared by the above preparation method of a highly alkali-stable cationic polymer.

Preferably, the cationic polymers include formulas (1) and (2), wherein, $R^6$ is independently selected from H, $C_{1-20}$-hydrocarbyl;

The counterion $A^-$ is selected from halogen ions, methyl sulfate ions, hydroxide ions, or bicarbonate ions.

Ar' units are independently selected from one or more of the following formulas:

Preferably, in addition to the formulas (1) and (2), cationic polymers can also contain the formulas (3), (4), and (5).

(3)

wherein $R^7$ is a hydrocarbyl or halogenated hydrocarbyl; $R^8$ is independently selected from H, $C_{1-20}$-hydrocarbyl; $R^9$ is an aryl group, and the aryl group is optionally substituted by fluorine and/or nitro and/or cyano groups.

The counterion $A^-$ is selected from halogen ions, methyl sulfate ions, hydroxide ions, or bicarbonate ions.

The application of the above highly alkali-stable cationic polymers is used in anion exchange membranes or catalyst layer binders.

Preferably, the preparation method of anion exchange membranes is that the alkali-stable cationic polymer is dissolved in a third organic solvent to obtain a cationic polymer solution, which is coated on the matrix, then the third organic solvent is removed by drying, and the anion exchange membrane is obtained through being peeled from the matrix.

Preferably, the coating method is one of solution casting, rotating coating, scraping, casting, or dipping, and the method of removing solvent is volatilization at room temperature or heating and drying at 30-100° C.

Preferably, the third organic reagent is at least one of the polar aprotic solvents including dimethyl sulfoxide, N-methylpyrrolidone, N,N-dimethylacetamide, and N,N-dimethylformamide.

Preferably, the preparation method of the catalyst layer binders is to dissolve or disperse the highly alkali-stable cationic polymers in a fourth organic solvent to obtain a solution or dispersion of the catalyst layer binders, the solution or dispersion of the catalyst layer binder is evenly mixed with the catalyst to obtain the slurry of the cationic polymer as the catalyst layer binder.

Preferably, the fourth organic solvent is a low boiling point organic solvent, which is preferably at least one of methanol, ethanol, n-propanol, isopropanol, and n-butanol.

Preferably, a concentration of cationic polymer solution is between 1 and 80 wt %, more preferably 1 and 75 wt %, and further preferably 1 and 40 wt %.

The basic principle of the present invention is:
the C-4 position of the piperidinium cation in the traditional poly(aryl piperidinium) polymer is changed to the C-3 position to be connected to the aromatic units, eliminating the two β-hydrogen atoms of the piperidinium cation, while the other two β-hydrogen atoms are far away from the aromatic moieties, making it less affected by the electron-withdrawing and conformational restriction effects of the aromatic units. Meanwhile, the steric hindrance effect of cyclic piperidinium cations is retained, which reduces the probability of Hoffman elimination pathway of the degradation of piperidinium cations in poly(aryl piperidinium) polymers, and this strategy can greatly improve the alkaline stability of poly(arylene piperidinium) polymers.

Therefore, the merits of the present invention are:
1. the preparation method of the highly alkali-stable cationic polymers provided by the present invention is simple and mild, and suitable for scale production;
2. the highly alkali-stable cationic polymers prepared by the invention has outstanding alkaline stability, and solves the problem of Hoffman elimination of traditional poly(arylene piperidinium) polymers in an alkaline environment;
3. the present invention provides highly alkali-stable cationic polymers, by changing the connection position of piperidinium cation and arylene group, results in an improved alkaline stability, which are suitable to the fabrication of anion exchange membrane or catalyst layer binder;
4. the cationic polymers prepared by the present invention can be used as a membrane material in many fields such as fuel cells and water electrolysis, meanwhile, the cationic polymers can also be served as a catalyst binder material in the catalyst layer of fuel cells and water electrolysis.

In the following, the technical scheme of the present invention is further described in detail through the attached drawings and embodiments.

DETAILED DESCRIPTION OF THE EMBODIMENTS

The following is a further explanation of the technical scheme of the present invention through drawings and embodiments.

The present invention can be explained in more detail through the following embodiments, the purpose of disclosing the present invention is to protect all changes and improvements within the scope of the invention, and the present invention is not limited to the following embodiments.

Embodiment 1

S1. The polymerization mixture composed of 3-piperidinone hydrochloride (0.19 g, 1.43 mmol) and p-terphenyl (0.3 g, 1.32 mmol), then 1.0 mL of dichloromethane and 1.2 mL of trifluoromethanesulfonic acid are added for catalytic polycondensation, the reaction is performed at 0° C. for 10 h to obtain a viscous polymer dispersion with piperidine moieties.

S2. The polymer dispersion from S1 with piperidine moieties is slowly added dropwise to mixed solution of methanol and water (1:1, v/v) to obtain a pale yellow fibrous polymer, after filtration, full washing, and vacuum drying, a white fibrous polymer powder with piperidine moieties is obtained (0.41 g).

S3. The polymer powder from S2 with piperidine moieties is dissolved in 4 mL of N-methylpyrrolidone, then 0.45 mL of methyl iodide and 0.2 g of potassium carbonate are added, after quaternization for 72 h at room temperature, a cationic polymer solution of i-PTP is obtained.

S4. The cationic polymer solution from S3 is slowly added to ether, filtered and dried to obtain 0.43 g of highly alkali-stable cationic polymer i-PTP powder, and the formula is as follows:

(1-1)

Application Example 1 a. Preparation of Anion Exchange Membrane

The highly alkali-stable cationic polymer powder prepared by embodiment 1 is dissolved in 4 mL of dimethyl sulfoxide to obtain a cationic polymer solution with a weight fraction of about 10%. The cationic polymer solution is coated on a glass plate by casting method, and the glass plate is placed in a thermoventilated oven at 80° C. for 24 h to remove the solvent. After the temperature is reduced to room temperature, the glass plate is taken out and immersed in deionized water to peel the membrane off, after being fully washed with deionized water, the anion exchange membrane with the counterion of I⁻ is obtained.

b. Replacing the Counterions of the Anion Exchange Membrane

The above anion exchange membrane with counterion of I⁻ is immersed in 1 mol/L of NaOH solution for 48 h, and then fully washed with deionized water to obtain an anion exchange membrane I with the counterion of OH⁻.

The anion exchange membrane with the counterion of I⁻ is immersed in 2 mol/L of NaCl solution for 24 h, and then fully washed with deionized water to obtain an anion exchange membrane II with the counterion of Cl⁻.

Figure 1:
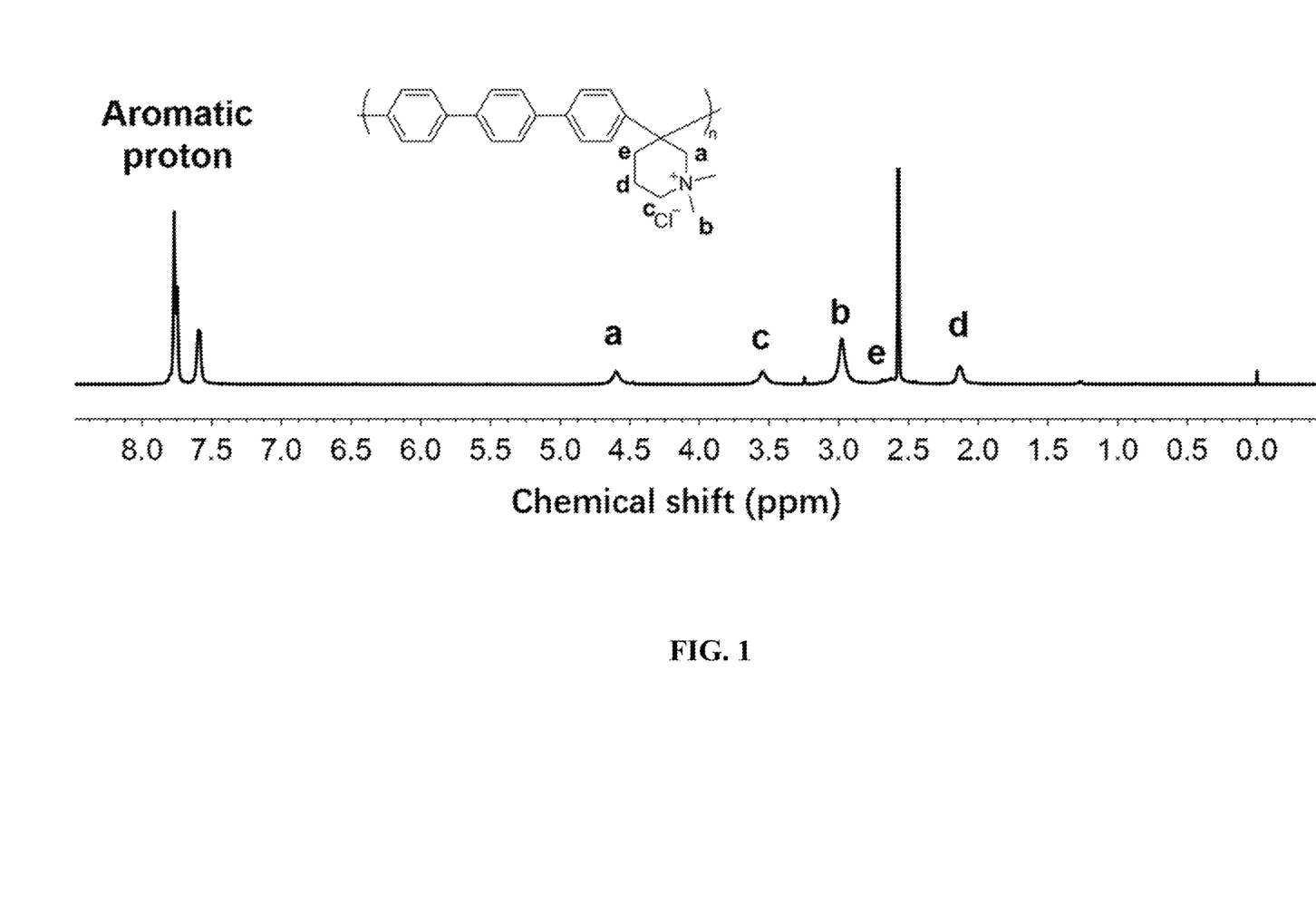
FIG. 1 shows a $^1$H NMR spectrum of the cationic polymer according to embodiment 1 of the present invention.

Using DMSO-$d_6$ as solvent, the chemical structure of anion exchange membrane II (formula 1-1) with the counterion of Cl⁻is confirmed by an Agilent 600 MHZ NMR spectrometer, as shown in FIG. 1.

c. Preparation of Catalyst Layer Binder

Ion exchanging is performed on the i-PTP polymer prepared in embodiment 1 as needed, for example, the i-PTP powder prepared in embodiment 1 with the counterion of iodide is immersed in 2 mol/L of NaOH solution for 48 h, and then fully washed with deionized water, after filtration, the i-PTP polymer with the counterion of OH⁻, which can act as a catalyst layer binder, is obtained.

The prepared catalyst layer binder (OH⁻form i-PTP) is dissolved in a mixed solvent of isopropanol and water at a solid content of 2 wt %, then mixed with a metal catalyst to prepare a uniformly dispersed slurry, that is, the slurry of the catalyst layer binder based on i-PTP in embodiment 1.

d. Performance Testing

The following tests are performed on the anion exchange membrane I, anion exchange membrane II and catalyst layer binders in application example 1 to characterize their basic properties.

(1) Hydroxide Conductivity

The anion exchange membrane is cut into a 1 cm×5 cm strip, which is then clamped on the fixture and immersed in deionized water, the electrode is connected to the electrochemical workstation. Using the constant current mode (0.1 mA), the scanning frequency ranges from 1 MHz to 100 Hz. From the Bode curve, the frequency range with stable impedance is found, and then the resistance R of the anion exchange membrane I is obtained.

The hydroxide conductivity is calculated by the following formula:

$$\sigma = \frac{L}{R \times w \times d}$$

wherein, R is the resistance of the anion exchange membrane I, L is the distance between the two electrodes (1.0 cm), W is the width of the anion exchange membrane, and d is the thickness of the anion exchange membrane.

Figure 2:
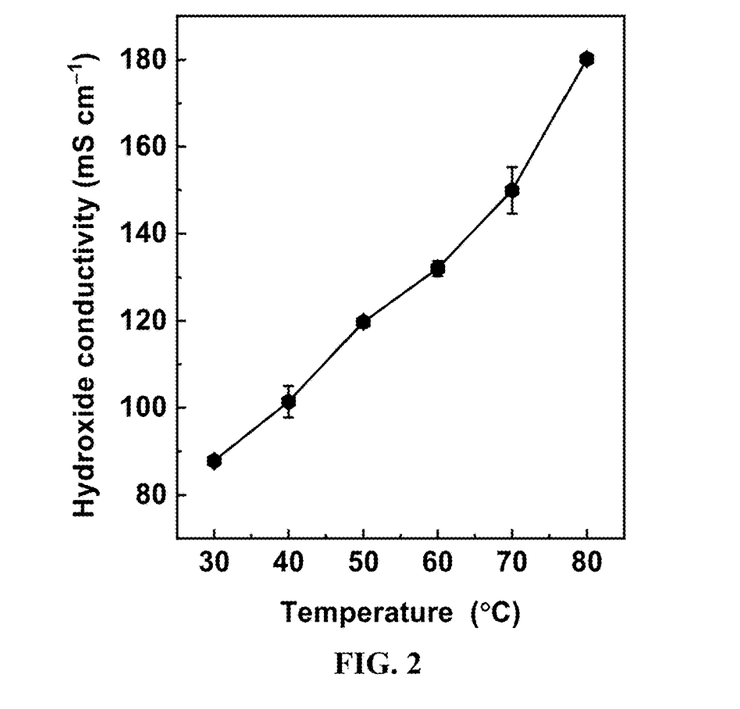
FIG. 2 shows temperature-dependent conductivities of anion exchange membrane I according to the application example 1 of the present invention.

According to the hydroxide conductivity measured at different temperatures, the temperature-dependent hydroxide conductivity of anion exchange membrane I is obtained, as shown in FIG. 2. It can be seen from FIG. 2 that the hydroxide conductivity of anion exchange membrane I achieves 180 mS cm⁻¹ at 80° C.

(2) Water Uptake and Swelling Ratio

The anion exchange membrane II with the counterion of chloride is cut into 1 cm×8 cm strip and fully dried in an oven, the weight of the dried anion exchange membrane II is recorded as $W_{dry}$, and then the dried anion exchange membrane II is immersed in deionized water, the anion exchange membrane II is taken out every 12 h, and the water on the surface of the anion exchange membrane II is wiped out, the weight of the anion exchange membrane II after immersion at different temperatures (30-80° C.) is recorded as $W_{wet}$.

The water uptake (WU) is calculated by the following formula:

$$WU = \frac{W_{wet} - W_{dry}}{W_{dry}} \times 100\%$$

Figure 3:
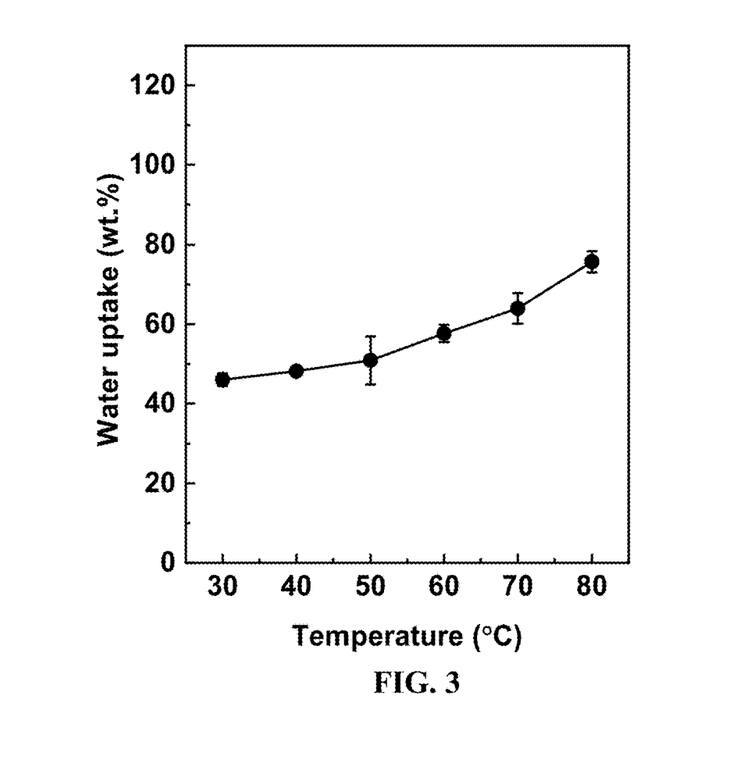
FIG. 3 shows temperature-dependent water uptakes of anion exchange membrane II according to the application example 1 of the present invention.

According to the water uptake of anion exchange membrane II at different temperatures, the temperature-dependent water uptake of anion exchange membrane II is obtained, as shown in FIG. 3.

The swelling ratio (SR) is an important parameter to evaluate the dimensional stability of the membrane, it is calculated by the length of the dry ($L_{dry}$) and wet ($L_{wet}$) anion exchange membrane II by the following formula:

$$SR = \frac{L_{wet} - L_{dry}}{L_{dry}} \times 100\%$$

Figure 4:
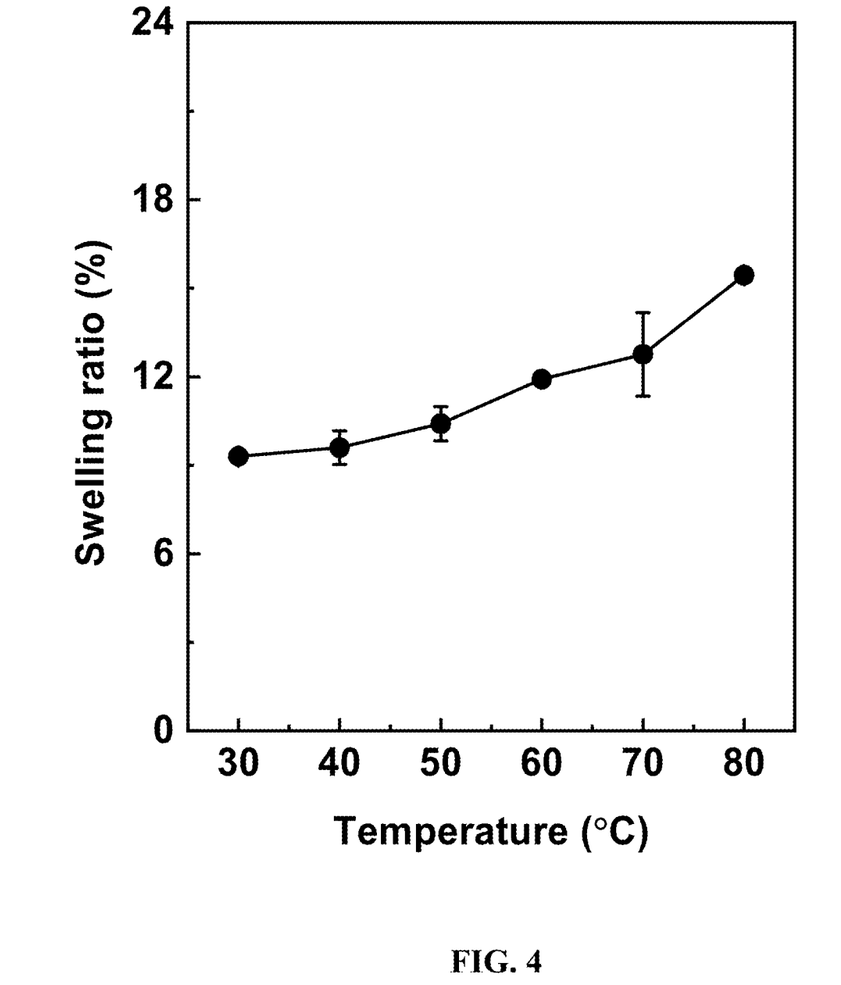
FIG. 4 shows temperature-dependent water swellings of anion exchange membrane II according to the application example 1 of the present invention.

According to the swelling ratio measured at different temperatures, the temperature-dependent swelling ratio of anion exchange membrane II is obtained, as shown in FIG. 4.

(3) Alkaline Stability

Figure 5:
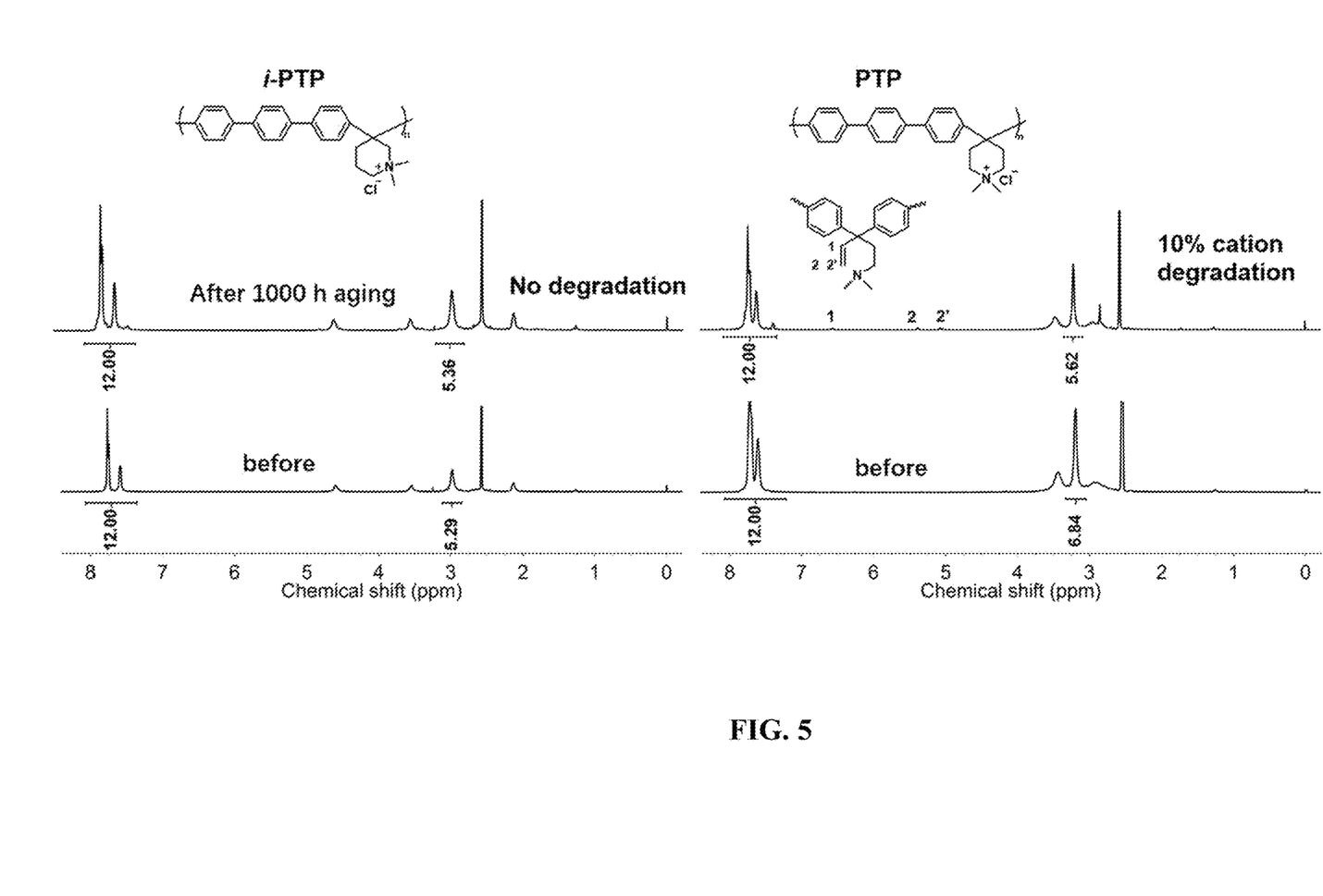
FIG. 5 shows $^1$H NMR spectra of i-PTP and traditional piperidinium-based PTP before and after an alkaline stability test according to embodiment 1 of the present invention.

The alkaline stability of i-PTP and traditional piperidinium-based AEM PTP was evaluated in 5 mol L⁻¹ NaOH aqueous solution at 80° C. for 1000 hours. After alkaline treatment, the chemical structures of the aged membrane as well as the original counterpart were characterized by ¹H NMR, as shown in FIG. 5. It can be seen from FIG. 5 that after 1000 hours of alkaline treatment, the integrals of piperidinium cation (3.0 ppm) of i-PTP is not declined relative to the integral of chemically inert aromatic protons (7.5-8.0 ppm). In addition, no obvious chemical shift changes and new signal peaks are observed in FIG. 5, which proved that i-PTP has outstanding alkaline stability.

On the other hand, the AEM PTP has a 10% ion loss after alkaline treatment, and the main degradation pathways is Hoffman degradation, which suggests that the highly alkali-stable cationic polymer in the invention exhibits higher alkaline stability than that of PTP.

(4) Electrochemical Performance

The i-PTP in embodiment 1 is used to prepare the catalyst layer binder and anion exchange membrane I, respectively, Pt/C is used as the cathode and anode catalyst, the Pt loading in the anode and cathode is 0.5 mg/cm², the membrane electrode assembly is prepared by catalyst-coated membrane technology.

Figure 6:
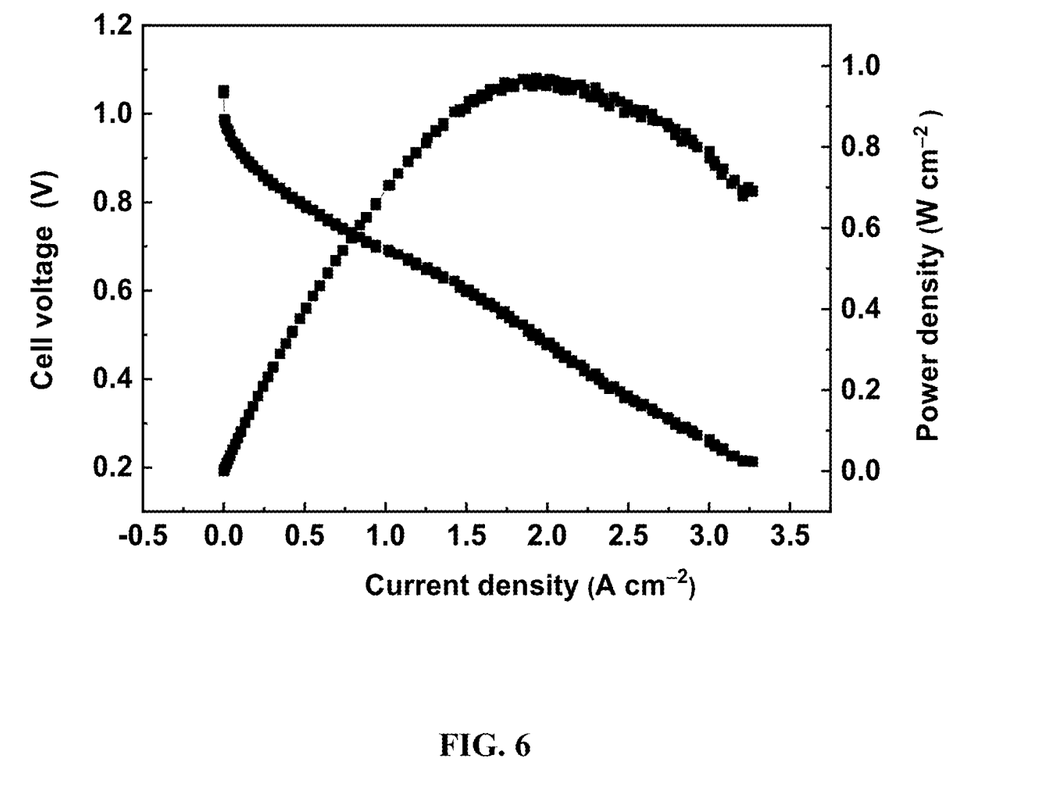
FIG. 6 shows $H_2/O_2$ polarization and power density curves of the catalyst layer binder and anion exchange membrane I according to embodiment 1 of the present invention.

The H₂—O₂ fuel cell test is performed at 80° C. with the gas flow rate of 300 mL/min and the back pressure of 150 kPa, the relative humidity (RH) is 100%, the electrochemical performance of the membrane electrode assembly based on the catalyst layer binder and anion exchange membrane prepared by i-PTP in embodiment 1 is tested, as shown in FIG. 6.

In summary, the hydroxide conductivity of anion exchange membrane I achieves a conductivity of 180 mS/cm at 80° C., anion exchange membrane II has higher water uptake and moderate swelling ratio, the peak power density of the membrane electrode assembly fabricated from i-PTP achieves a high peak power density of 0.97 W/cm₂, and there is no degradation after soaking in 5 mol/L NaOH aqueous solution for 1000 h at 80° C.

Embodiment 2

S1. The polymerization mixture composed of 3-piperidinone hydrochloride (0.19 g, 1.43 mmol), p-terphenyl (0.15 g, 0.66 mmol), and 9,9-dimethylfluorene (0.13 g, 0.66 mmol), then 1.1 mL of dichloromethane and 1.2 mL of trifluoromethanesulfonic acid are added for catalytic polycondensation, the reaction is performed at 0° C. for 8 h to obtain a viscous polymer dispersion with piperidine moieties.

S2. The polymer dispersion from S1 with piperidine moieties is slowly added dropwise to mixed solution of methanol and water 1:1 (v/v) to obtained a pale yellow fibrous polymer, after filtration, full washing, and vacuum drying, a white fibrous polymer powder with piperidine moieties is obtained (0.39 g)

S3. The polymer powder from S2 with piperidine moieties is dissolved in 4 mL of N-methyl-2-pyrrolidone, then 0.42 mL of methyl iodide and 0.2 g of potassium carbonate are added, after quaternization for 72 h at room temperature, a cationic polymer solution is obtained.

S4. The cationic polymer solution from S3 is slowly added to the ether, filtered and dried to obtain 0.42 g of highly alkali-stable cationic polymer powder, and the formula is as follows:

(1-2)

Application Example 2 a. Preparation of Anion Exchange Membrane

The highly alkali-stable cationic polymer powder prepared by embodiment 2 is dissolved in 4 mL of dimethyl sulfoxide to obtain a cationic polymer solution with a weight fraction of about 10%. The cationic polymer solution is coated on a glass plate by casting method, and the glass plate is placed in a thermoventilated oven at 80° C. for 24 h to remove the solvent. After the temperature is reduced to room temperature, the glass plate is taken out and immersed in deionized water to peel the membrane off, after being fully washed with deionized water, the anion exchange membrane with the counterion of I$^-$ is obtained.

b. Replacing the Counterions of the Anion Exchange Membrane

Ion exchanging is performed on the anions of the anion exchange membrane with the counterion of I$^-$ prepared in a as needed, for example, the anion exchange membrane with the counterion of I$^-$ is immersed in 2 mol/L of NaCl solution for 24 h, and then fully washed with deionized water to obtain an anion exchange membrane with the counterion of Cl$^-$.

c. Preparation of Catalyst Layer Binder

Ion exchanging is performed on the counterions in the cationic polymer prepared in embodiment 2 as needed, for example, the cationic polymer powder prepared in embodiment 2 is immersed in 2 mol/L of NaOH solution for 48 h, and then fully washed with deionized water, after filtration, the cationic polymer with counterion of OH$^-$, which can act as a catalyst layer binder, is obtained.

The prepared cationic polymer with counterion of OH$^-$ is dissolved in a mixed solvent of isopropanol and water at a solid content of 2 wt %, then mixed with a metal catalyst to prepare a uniformly dispersed slurry, that is, the slurry of the catalyst layer binder based on the cationic polymer in embodiment 2.

Embodiment 3

S1. The polymerization mixture composed of 3-piperidinone hydrochloride (0.1 g, 0.72 mmol), p-terphenyl (0.3 g, 1.32 mmol) and trifluoroacetone (0.08 g, 0.72 mmol), then 0.8 mL of dichloromethane and 0.8 mL of trifluoromethanesulfonic acid are added for catalytic polycondensation, the reaction is performed at 0° C. for 14 h to obtain a viscous polymer dispersion with a piperidine moieties.

S2. The polymer dispersion from S1 with piperidine moieties is slowly added dropwise to mixed solution of methanol and water (1:1, v/v) to obtain a pale yellow fibrous polymer, after filtration, full washing, and vacuum drying, a white fibrous polymer powder with piperidine moieties (0.34 g).

S3. The polymer powder from S2 with piperidine moieties is dissolved in 4 mL of N-methylpyrrolidone, then 0.42 mL of methyl iodide and 0.15 g of potassium carbonate were added, after quaternization for 72 h at room temperature, a cationic polymer solution was obtained.

S4. The cationic polymer solution from S3 is slowly added to the ether, filtered and dried to obtain 0.36 g of highly alkali-stable cationic polymer powder, and the formula is as follows:

(1-3)

Application Example 3 a. Preparation of Anion Exchange Membrane

The highly alkali-stable cationic polymer powder prepared by embodiment 3 is dissolved in 4 mL of dimethyl sulfoxide to obtain a cationic polymer solution with a weight fraction of about 10%. The cationic polymer solution is coated on a glass plate by casting method, and the glass plate is placed in a thermoventilated oven at 80° C. for 24 h to remove the solvent. After the temperature is reduced to room temperature, the glass plate is taken out and immersed in deionized water to peel the membrane off, after being fully washed with deionized water, the anion exchange membrane with the counterion of I$^-$ is obtained.

b. Replacing the Counterions of the Anion Exchange Membrane

Ion exchanging is performed on the anions in the anion exchange membrane with the counterion of I⁻ prepared in a as needed, for example, the anion exchange membrane with the counterion of I⁻ is immersed in 2 mol/L of NaCl solution for 48 h, and then fully washed with deionized water to obtain an anion exchange membrane with the counterion of Cl⁻.

c. Preparation of Catalyst Layer Binder

Ion exchanging is performed on the counterions in the cationic polymer prepared in embodiment 3 as needed, for example, the cationic polymer powder prepared in embodiment 3 is immersed in 2 mol/L of NaOH solution for 48 h, and then fully washed with deionized water, after filtration, a cationic polymer with a counterion of OH⁻, which can act as a catalyst layer binder, is obtained.

The cationic polymer with the counterion of OH⁻ is dissolved in a mixed solvent of isopropanol and water at a solid content of 2 wt %, then mixed with a metal catalyst to prepare a uniformly dispersed slurry, that is, the slurry based on the cationic polymer in embodiment 3.

Embodiment 4

S1. The polymerization mixture composed of 3-piperidinone hydrochloride (0.1 g, 0.72 mmol), p-terphenyl (0.3 g, 1.32 mmol) and p-cyanobenzaldehyde (0.1 g, 0.72 mmol), then 0.9 mL of dichloromethane and 0.3 mL of trifluoromethanesulfonic acid are added for catalytic polycondensation, the reaction is performed at 0° C. for 5 h to obtain a viscous polymer dispersion with piperidine moieties.

S2. The polymer dispersion from S1 with piperidine moieties is slowly added dropwise to the mixed solution of methanol and water (1:1 v/v) to obtain a pale yellow fibrous polymer, after filtration, full washing, and vacuum drying, a white fibrous polymer powder with piperidine moieties is obtained (0.38 g).

S3. The polymer powder from S2 with piperidine moieties is dissolved in 4 mL of N-methylpyrrolidone, then 0.22 mL of methyl iodide and 0.15 g of potassium carbonate are added, after quaternization for 72 h at room temperature, a cationic polymer solution is obtained.

S4. The cationic polymer solution from S3 is slowly added to ether, filtered and dried to obtain 0.40 g highly alkali-stable cationic polymer powder, and the formula is as follows:

Application Example 4 a. Preparation of Anion Exchange Membrane

The highly alkali-stable cationic polymer powder prepared by embodiment 4 is dissolved in 4 mL of dimethyl sulfoxide to obtain a cationic polymer solution with a weight fraction of about 10%. The cationic polymer solution is coated on a glass plate by casting method, and the glass plate is placed in a thermoventilated oven at 80° C. for 24 h to remove the solvent. After the temperature is reduced to room temperature, the glass plate is taken out and immersed in deionized water to peel the membrane off, after being fully washed with deionized water, the anion exchange membrane with the counter ion of I⁻ is obtained.

b. Replacing the Counterions of the Anion Exchange Membrane

Ion exchanging is performed on the anions in the anion exchange membrane with the counterion of I⁻ prepared in a as needed, the anion exchange membrane with the counterion of I⁻ is immersed in 2 mol/L of NaCl solution for 48 h, and then fully washed with deionized water to obtain an anion exchange membrane with the counterion of Cl⁻.

Embodiment 5

S1. The polymerization mixture composed of 3-piperidinone hydrochloride (0.17 g, 1.29 mmol), p-terphenyl (0.3 g, 1.32 mmol) and N-methyl-piperidone (0.02 g, 0.14 mmol), then 1.2 mL of dichloromethane and 1.2 mL of trifluoromethanesulfonic acid are added for catalytic polycondensation, the reaction is performed at 0° C. for 10 h to obtain a viscous polymer dispersion with piperidine moieties.

S2. The polymer dispersion from S1 with piperidine moieties is slowly added dropwise to the mixed solution of methanol and water (1:1 v/v) obtain a pale yellow fibrous polymer, after filtration, full washing, and vacuum drying, a white fibrous polymer powder with piperidine moieties is obtained (0.42 g).

S3. The polymer powder from S2 with piperidine moieties is dissolved in 4 mL of N-methylpyrrolidone, then 0.22 mL of methyl iodide and 0.15 g of potassium carbonate are added, after quaternization for 72 h at room temperature, the cationic polymer solution is obtained.

S4. The cationic polymer solution from S3 is slowly added to ether, filtered and dried to obtain 0.41 g of highly alkali-stable cationic polymer powder, and the formula is as follows:

(1-4)

(1-5)

Application Example 5 a. Preparation of Anion Exchange Membrane

The highly alkali-stable cationic polymer powder prepared by embodiment 5 is dissolved in 4 mL of dimethyl sulfoxide to obtain a cationic polymer solution with a weight fraction of about 10%. The cationic polymer solution is coated on a glass plate by casting method, and the glass plate is placed in a thermoventilated oven at 80° C. for 24 h to remove the solvent. After the temperature is reduced to room temperature, the glass plate is taken out and placed in deionized water to peel the membrane off, after being fully washed with deionized water, the anion exchange membrane with the counterion of I⁻ is obtained.

b. Replacing the Counterions of the Anion Exchange Membrane

Ion exchanging is performed on the anions in the anion exchange membrane with the counterion of I⁻ prepared in a as needed, for example, the anion exchange membrane with the counterion of I⁻ is immersed in 2 mol/L of NaCl solution for 48 h, and then fully washed with deionized water to obtain an anion exchange membrane with the counterion of Cl⁻.

Embodiment 6

S1. The polymerization mixture composed of 3-piperidinone hydrochloride (0.19 g, 1.43 mmol) and p-terphenyl (0.3 g, 1.32 mmol), then 1.2 mL of dichloromethane and 1.2 mL of trifluoromethanesulfonic acid are added for catalytic polycondensation, the reaction is performed at 0° C. for 10 h to obtain a viscous polymer dispersion with piperidine moieties.

S2. The polymer dispersion from S1 with piperidine moieties is slowly added dropwise to the mixed solution of methanol and water (1:1, v/v), after filtration, full washing, and vacuum drying, a white fibrous polymer powder with piperidine moieties is obtained (0.41 g).

S3. The polymer powder from S2 with piperidine moieties is dissolved in 4 mL of N-methylpyrrolidone, then 0.013 mL of methyl iodide, 0.1 g of 1,6-diiodohexane and 0.2 g of potassium carbonate are added, after quaternization for 72 h at room temperature, the cationic polymer solution is obtained.

S4. The cationic polymer solution from S3 is slowly added to the ether, filtered and dried to obtain 0.41 g of highly alkali-stable cationic polymer powder, and the formula is as follows:

(1-6)

Application Example 6 a. Preparation of Anion Exchange Membrane

The highly alkali-stable cationic polymer powder prepared by embodiment 6 is dissolved in 4 mL of dimethyl sulfoxide to obtain a cationic polymer solution with a weight fraction of about 10%. The cationic polymer solution is coated on a glass plate by casting method, and the glass plate is placed in a thermoventilated oven at 80° C. for 24 h to remove the solvent. After the temperature is reduced to room temperature, the glass plate is taken out and placed in deionized water to peel the membrane off, after being fully washed with deionized water, the anion exchange membrane with the counterion of I⁻ is obtained.

b. Replacing the Counterions of the Anion Exchange Membrane

Ion exchanging is performed on the anions in the anion exchange membrane with the counterion of I⁻ prepared in a as needed, for example, the anion exchange membrane with the counterion of I⁻ is immersed in 2 mol/L of NaCl solution for 48 h, and then fully washed with deionized water to obtain an anion exchange membrane with the counterion of Cl⁻.

Embodiment 7

S1. The polymerization mixture composed of 3-piperidinone hydrochloride (0.19 g, 1.43 mmol) and spiro (cyclohexane-1,9'-fluorene) (0.32 g, 1.29 mmol), then 1.2 mL of dichloromethane and 1.2 mL of trifluoromethanesulfonic acid are added for catalytic polycondensation, and the reaction is performed at 0° C. for 10 h to obtain a viscous polymer dispersion with piperidine moieties.

S2. The polymer dispersion from S1 with piperidine moieties is slowly added dropwise to the mixed solution of methanol and water (1:1, v/v) to obtain a pale yellow fibrous polymer, after filtration, full washing, and vacuum drying, a white fibrous polymer powder with piperidine moieties is obtained (0.41 g).

S3. The polymer powder from S2 with piperidine moieties is dissolved in 4 mL of N-methylpyrrolidone, then 0.45 mL of methyl iodide and 0.2 g of potassium carbonate are added, after quaternization for 72 h at room temperature, a cationic polymer solution is obtained.

S4. The cationic polymer solution from S3 is slowly added to ether, filtered and dried to obtain 0.41 g of highly alkali-stable cationic polymer powder, and the structure is as follows:

(1-7)

Application Example 7 a. Replacing the Counterions in Cationic Polymer Powders

Ion exchanging is performed on the highly alkali-stable cationic polymer powder with counterion of I⁻ prepared in embodiment 7 as needed, for example, the cationic polymer powders with counterion of I⁻ is immersed in 2 mol/L of NaOH solution for 48 h, and then fully washed with deionized water, after filtration, a highly alkali-stable cationic polymer powder with counterion of OH⁻, which can act as a catalyst layer binder, is obtained.

b. Preparation of Catalyst Layer Binder

The cationic polymer with the counterion of OH-is dissolved in a mixed solvent of isopropanol and water at a solid content of 2 wt %, then mixed with a metal catalyst to prepare a uniformly dispersed slurry, that is, the slurry based on the cationic polymer in embodiment 7.

Embodiment 8

S1. The polymerization mixture composed of 3-piperidinone hydrochloride (0.19 g, 1.43 mmol) and p-terphenyl (0.40 g, 1.29 mmol), then 1.1 mL of dichloromethane and 1.2 mL of trifluoromethanesulfonic acid are added for catalytic polycondensation, the reaction is performed at 0° C. for 10 h to obtain a viscous polymer dispersion with a piperidine moieties.

S2. The polymer dispersion from S1 with piperidine moieties is slowly added dropwise to the mixed solution of methanol and water (1:1, v/v) to obtain a pale yellow fibrous polymer, after filtration, full washing, and vacuum drying, a white fibrous polymer powder with piperidine moieties is obtained (0.55 g).

S3. The polymer powder from S2 with piperidine moieties is dissolved in 5 mL of N-methylpyrrolidone, then 0.45 mL of methyl iodide and 0.2 g of potassium carbonate are added, after quaternization for 72 h at room temperature, a cationic polymer solution is obtained.

S4. The cationic polymer solution from S3 is slowly added to ether, filtered and dried to obtain 0.61 g of high alkali-stable cationic polymer powder, and the formula is as follows:

(1-8)

Application Example 8 a. Preparation of Anion Exchange Membrane

The highly alkali-stable cationic polymer powder prepared by embodiment 8 is dissolved in 4 mL of dimethyl sulfoxide to obtain a cationic polymer solution with a weight fraction of about 10%. The cationic polymer solution is coated on a glass plate by casting method, and the glass plate is placed in a thermoventilated oven at 80° C. for 24 h to remove the solvent. After the temperature is reduced to room temperature, the glass plate is taken out and placed in deionized water to peel the membrane off, after being fully washed with deionized water, the anion exchange membrane with the counterion of I⁻ is obtained.

b. Replacing the Counterions of the Anion Exchange Membrane

Ion exchanging is performed on the anions in the anion exchange membrane with the counterion of I⁻ prepared in a as needed, for example, the anion exchange membrane with the counterion of I⁻ is immersed in 2 mol/L of NaCl solution for 48 h, and then fully washed with deionized water to obtain an anion exchange membrane with the counterion of Cl⁻.

Embodiment 9

S1. The polymerization mixture composed of 3-piperidinone hydrochloride (0.19 g, 1.43 mmol), spiro (cyclofluorene-1,9'-fluorene) (0.29 g, 1.29 mmol) and bibenzyl (0.23 g, 1.29 mmol), then 1.2 mL of dichloromethane and 3.2 mL of trifluoromethanesulfonic acid are added for catalytic polycondensation, the reaction is performed at 0° C. for 24 h to obtain a viscous polymer dispersion with piperidine moieties.

S2. The polymer dispersion from S1 with piperidine moieties is slowly added dropwise to the mixed solution of methanol and water (1:1, v/v) to obtain a pale yellow fibrous polymer, after filtration, full washing, and vacuum drying, a white fibrous polymer powder with piperidine moieties is obtained (0.75 g).

S3. The polymer powder from S2 with piperidine moieties is dissolved in 4 mL of N-methylpyrrolidone, then 0.45 mL of methyl iodide and 0.2 g of potassium carbonate are added, after quaternization for 72 h at room temperature, a cationic polymer solution is obtained.

S4. The cationic polymer solution from S3 is slowly added to ether, filtered and dried to obtain 0.81 g of highly alkali-stable cationic polymer powder, and the formula is as follows:

(1-9)

Application Example 9 a. Replacing the Counterions in the Cationic Polymer Powder

Ion exchanging is performed on the highly alkali-stable cationic polymer powder with counterion of $I^-$ prepared in embodiment 9 as needed, for example, the cationic polymer powder with counterion of $I^-$ is immersed in 2 mol/L of NaOH solution for 48 h, and then the powder is fully washed with deionized water, after filtration, a highly alkali-stable cationic polymer powder with counterion of $OH^-$, which can act as a catalyst layer binder, is obtained.

b. Preparation of Catalyst Layer Binder

The cationic polymer with the counterion of OH is dissolved in a mixed solvent of isopropanol and water at a solid content of 2 wt %, then mixed with a metal catalyst to prepare a uniformly dispersed slurry, that is, the slurry based on the cationic polymer in embodiment 9.

Embodiment 10

S1. The polymerization mixture composed of 3-piperidinone hydrochloride (0.19 g, 1.43 mmol), N-methylpiperidinone (0.03 g, 0.05 mmol), trifluoroacetophenone (0.05 g, 0.05 mmol) and spiro (cyclofluorene-1,9'-fluorene) (0.52 g, 1.29 mmol), then 8.0 mL of dichloromethane (8.0 mL) and 11.0 mL of trifluoromethanesulfonic acid are added for catalytic polycondensation, the reaction is performed at 0° C. for 48 h to obtain a viscous polymer dispersion with piperidine moieties.

S2. The polymer dispersion from S1 with piperidine moieties is slowly added dropwise to mixed solution of methanol and water (1:1, v/v) to obtain a pale yellow fibrous polymer, after filtration, full washing, and vacuum drying, a white fibrous polymer powder with piperidine moieties is obtained (0.80 g).

S3. The polymer powder from S2 with piperidine moieties is dissolved in 8 mL of N-methylpyrrolidone, then 0.45 mL of methyl iodide and 0.2 g of potassium carbonate are added, after quaternization for 72 h at room temperature, a cationic polymer solution is obtained.

S4. The cationic polymer solution from S3 is slowly added to the ether, filtered and dried to obtain 0.86 g of highly alkali-stable cationic polymer powder, and the formula is as follows:

(1-10)

Application Example 10 a. Replacing the Counterions in the Cationic Polymer Powder

Ion exchanging is performed on the highly alkali-stable cationic polymer powder with counterion of $I^-$ prepared in embodiment 10 as needed, for example, the anion exchange membrane with counterion of $I^-$ is immersed in 2 mol/L of NaOH solution for 48 h, and then the powder is fully washed with deionized water, after filtration, a highly alkali-stable cationic polymer powder with counterion of $OH^-$, which can act as a catalyst layer binder, is obtained.

b. Preparation of Catalyst Layer Binder

The cationic polymer with the counterion of OH is dissolved in a mixed solvent of isopropanol and water at a solid content of 2 wt %, then mixed with a metal catalyst to prepare a uniformly dispersed slurry, that is, the slurry based on the cationic polymer in embodiment 10.

Finally, it should be noted that the above embodiments are only used to illustrate the technical scheme of the invention rather than to restrict it, although the invention is described in detail with reference to the better embodiments. The ordinary technical personnel in this field should understand that they can still modify or replace the technical scheme of the invention, and these modifications or equivalent replacements can not make the modified technical scheme out of the spirit and scope of the technical scheme of the invention.

What is claimed is:

1. A preparation method of highly alkali-stable cationic polymers, comprising the following steps:
   s1. placing a polymerization compound mixture comprising 1-$R^1$-3-piperidinone or its salts or hydrate thereof and arenes in a first organic solvent, performing catalytic polycondensation by adding organic strong acids, performing the reaction at −20-100° C. for 0.1-200 h, and obtaining a polymer dispersion comprising the piperidine moieties;

in s1, 1-$R^1$-3-piperidinone having the following formula:

$R^1$ is independently selected from H, $C_{1-20}$-hydrocarbyl; in s1, arenes having one or more of the following structures:

s2. slowly dropping the polymer dispersion from s1 with piperidine moieties into a first precipitant, filtering and washing the obtained fibrous polymer, and obtaining a polymer powder with piperidine moieties after vacuum drying;

s3. dissolving the polymer powder from s2 with piperidine moieties in a second organic solvent, then adding the quaternization reagent, obtaining a cationic polymer solution after a quaternization reaction at 0-100° C. for 0.1-200 h;

the quaternization reagents are dimethyl sulfate or halogenated hydrocarbons comprising 1 to 20 C atoms;

s4. slowly adding the cationic polymer solution from s3 to a second precipitant, and obtaining a cationic polymer powder by filtration and drying;

s5. immersing the cationic polymer powder from s4 in a solution containing other types of counterions for ion exchanging to obtain a cationic polymer containing other types of counterions.

2. The preparation method of highly alkali-stable cationic polymers according to claim 1, wherein in s1, the polymerization mixture also comprises carbonyl monomers, which are one or more of the following formulas, wherein, $R^2$ is a hydrocarbyl or halogenated hydrocarbyl;
$R^3$ is independently selected from H, $C_{1-20}$-hydrocarbyl;
$R^4$ is an aryl, and the aryl is optionally substituted with halide and/or nitro and/or cyano.

3. The preparation method of highly alkali-stable cationic polymers according to claim 1, wherein in s1, the first organic reagent is one or more of dichloromethane, chloroform, carbon tetrachloride, dichloroethane, nitromethane, and nitrobenzene, the organic strong acid is at least one of methanesulfonic acid, trifluoromethanesulfonic acid, and trifluoroacetic acid.

4. The preparation method of highly alkali-stable cationic polymers according to claim 1, wherein in s3, the second organic reagent is at least one of the polar aprotic solvents comprising dimethyl sulfoxide, N-methylpyrrolidone, N,N-dimethylacetamide, and N,N-dimethylformamide.

5. The preparation method of highly alkali-stable cationic polymers according to claim 1, wherein highly alkali-stable cationic polymers are prepared.

6. An application of highly alkali-stable cationic polymers according to claim 5, wherein highly alkali-stable cationic polymers are used in anion exchange membranes or catalyst layer binders.

7. The application according to claim 6, wherein the preparation method of anion exchange membranes is that the alkali-stable cationic polymer is dissolved in a third organic solvent to obtain a cationic polymer solution, which is coated on the matrix, then the third organic solvent is removed by drying, and the anion exchange membrane is obtained through being peeled the matrix.

8. The application according to claim 6, wherein the preparation method of the catalyst layer binders is to dissolve or disperse the highly alkali-stable cationic polymers in a fourth organic solvent to obtain a solution or dispersion of the catalyst layer binders, the solution or dispersion of the catalyst layer binder is evenly mixed with the catalyst to obtain the slurry of the cationic polymer as the catalyst layer binder.

9. The preparation method of highly alkali-stable cationic polymers according to claim 2, wherein highly alkali-stable cationic polymers are prepared.

10. The preparation method of highly alkali-stable cationic polymers according to claim 3, wherein highly alkali-stable cationic polymers are prepared.

11. The preparation method of highly alkali-stable cationic polymers according to claim 4, wherein highly alkali-stable cationic polymers are prepared.

* * * * *